United States Patent [19]

Phoenix et al.

[11] Patent Number: 5,764,765
[45] Date of Patent: Jun. 9, 1998

[54] METHOD FOR KEY DISTRIBUTION USING QUANTUM CRYPTOGRAPHY

[75] Inventors: Simon James Phoenix, Suffolk; Stephen Mark Barnett, Glasgow, both of United Kingdom

[73] Assignee: British Telecommunications public limited company, London, England

[21] Appl. No.: 612,881

[22] PCT Filed: Sep. 8, 1994

[86] PCT No.: PCT/GB94/01955

§ 371 Date: Apr. 22, 1996

§ 102(e) Date: Apr. 22, 1996

[87] PCT Pub. No.: WO95/07585

PCT Pub. Date: Mar. 16, 1995

[30] Foreign Application Priority Data

| Sep. 9, 1993 | [EP] | European Pat. Off. | 93307120 |
| Sep. 9, 1993 | [EP] | European Pat. Off. | 93307121 |
| Oct. 6, 1993 | [WO] | WIPO | PCT/GB93/02075 |
| Dec. 23, 1993 | [WO] | WIPO | PCT/GB93/02637 |
| Mar. 31, 1994 | [EP] | European Pat. Off. | 94302359 |

[51] Int. Cl.⁶ .................................................. H04L 9/08
[52] U.S. Cl. ................................................. 380/21; 380/59
[58] Field of Search ............................ 380/9, 21, 59; 359/112, 158

[56] References Cited

U.S. PATENT DOCUMENTS

| 5,243,649 | 9/1993 | Franson | 380/9 |
| 5,307,410 | 4/1994 | Bennett | 380/21 |
| 5,339,182 | 8/1994 | Kimble et al. | 359/112 |
| 5,418,905 | 5/1995 | Rarity et al. | 359/158 |
| 5,515,438 | 5/1996 | Bennett et al. | 380/21 |

Primary Examiner—Salvatore Cangialosi
Attorney, Agent, or Firm—Nixon & Vanderhye P.C.

[57] ABSTRACT

In a communication system using quantum cryptography for the distribution of a key, two stations each independently modulate a single-photon signal. The single-photon signal is transmitted to the two stations from an external source, and passes through the stations in series. The signal subsequently passes onto a third station which detects the state of the signal, and compares it with the state of the signal as originally transmitted. This third station communicates the results of the comparison to the two stations, and the two stations establish a shared secret key for the subsequent encryption of traffic between the stations. Both the source of the single-photon signal and the single-photon detector may be combined in a transmitter station (Alice).

13 Claims, 7 Drawing Sheets

METHOD FOR KEY DISTRIBUTION USING QUANTUM CRYPTOGRAPHY

BACKGROUND TO THE INVENTION

The present invention relates to a system for the communication of encrypted data using quantum cryptography.

Quantum cryptography is a method for distributing a secret key between users of a communications system in such a way that the security of the key can be guaranteed. This is done by testing for variations in the statistics of transmitted data which occur when an eavesdropper intercepts signals on a quantum channel. Examples of such techniques are disclosed in C. H. Bennett, F. Bessette, G. Brassard, L. Salvail and J. Smolin, "Experimental Quantum Cryptography", Journal of Cryptography, 5 3 (1992) and in the other references cited below. Recent work by the present applicants in this field is described and claimed in our co-pending international applications PCT/GB93/02075 and PCT/GB93/02637 and in two further international applications filed this day entitled "QUANTUM CRYPTOGRAPHY ON A MULTIPLE ACCESS NETWORK" (U.S. application Ser. No. 08/605,048, pending) and "QUANTUM CRYPTOGRAPHY" (U.S. application Ser. No. 08/612,880, pending). The disclosures of these co-pending applications are incorporated herein by reference.

Hitherto, all communications systems using quantum cryptography have required that at least one of the two parties establishing the secret key should have a source of single-photon signals and/or a single-photon detector. The original proposals for quantum cryptographic systems all described point-to-point links between two users (conventionally named Alice and Bob). Our above-cited international applications disclose a method whereby this basic technique may be extended to multiple-access systems in which different respective secret keys are established between the transmitter Alice and a number of receivers Bob (1) ... Bob(N).

SUMMARY OF THE INVENTION

According to a first aspect of the present invention, there is provided a method of communication using quantum cryptography characterised in that two stations each independently modulate a single-photon signal transmitted from an external source to both of the stations in series, the said signal subsequently passing on to a third station which detects the state of the signal, compares it with the state of the signal as originally transmitted, and communicates the results of the comparison to the two stations, the two stations thereby establishing a shared secret key.

The present invention provides a new method of quantum cryptography which allows any pair of users connected, for example, to an optical network, to establish a secret key between them. This key is private to the two users and is known neither to any other stations connected to the network, nor to the transmitter which provides the source of the single-photon signals. The users Bob(1) and Bob(2) need only modulate the single-photon signal and so do not need to have the expensive and specialised equipment necessary to produce or detect single-photons. This is a significant practical advantage by contrast with previous proposals which have required that at least one of the two parties establishing the secret key should have the means to produce and/or detect single photons.

Preferably the third station includes the source for the single-photon signal and transmits the signal from the source encoded in a predetermined phase or polarisation state, and includes a single-photon detector and measures the state of the single-photon signal as returned from the two stations.

Preferably a multiplicity of stations (Bob(1), Bob(2) ... Bob(N)) are connected to the transmitter station by a common communications network, and the method further comprises an initial contention step in which a selected two of the multiplicity of stations establish an exclusive right to use specific transmissions of the single-photon signal for establishing a mutual secret key.

The present invention may be used, for example, with an optical-fibre based LAN, such as the well known FDDI optical fibre ethernet network. With such a network there might be, for example, ten client stations (Bob1 ... Bob10) connected to the network in a ring configuration, together with a transmitter station Alice. The method of the present invention can be used with such a network, however only two stations can establish a key from any one transmission or series of transmissions on the quantum channel. Contention procedures are therefore needed for the different stations. These might involve, for example, two stations Bob(1) and Bob(2) signalling to each other and to the transmitter Alice that they wish to establish a key. Alice may then signal to the other users on the network that certain time slots are to be used for this purpose. The other users than refrain from modulating signals on the quantum channel during the specified time slots reserved for Bob(1) and Bob(2).

The present invention can be applied to systems using a wide variety of different quantum cryptographic protocols including rejected data protocols as described in our co-pending international application no. PCT/GB93/02075, four-state protocols as described in the original IBM paper [3] discussed below, or alternatively with two-state protocols, as also discussed in further detail below.

According to a second aspect of the present invention there is provided a communications system for use in a method of quantum cryptography comprising a communications network arranged to carry a quantum channel, a single-photon source arranged to output single-photons signals onto the network, at least two stations (Bob(1),Bob(2)) connected to the network and each including a modulator arranged to modulate in series the single-photon signal and a third station (Alice) including a single-photon detector arranged to detect the single-photon signal after its modulation by the at least two stations (Bob(1),Bob(2)), in use the third station Alice comparing the state of the single-photon signal as received with the state of the signal as originally transmitted and communicating the result of the comparison to the two stations and the two stations establishing a shared secret key.

DESCRIPTION OF THE DRAWINGS

Systems embodying the present invention will now be described in further detail, by way of example only, and the theoretical background to the present invention discussed, with reference to the accompanying drawings in which.

DESCRIPTION OF EXAMPLES

Figure 1:
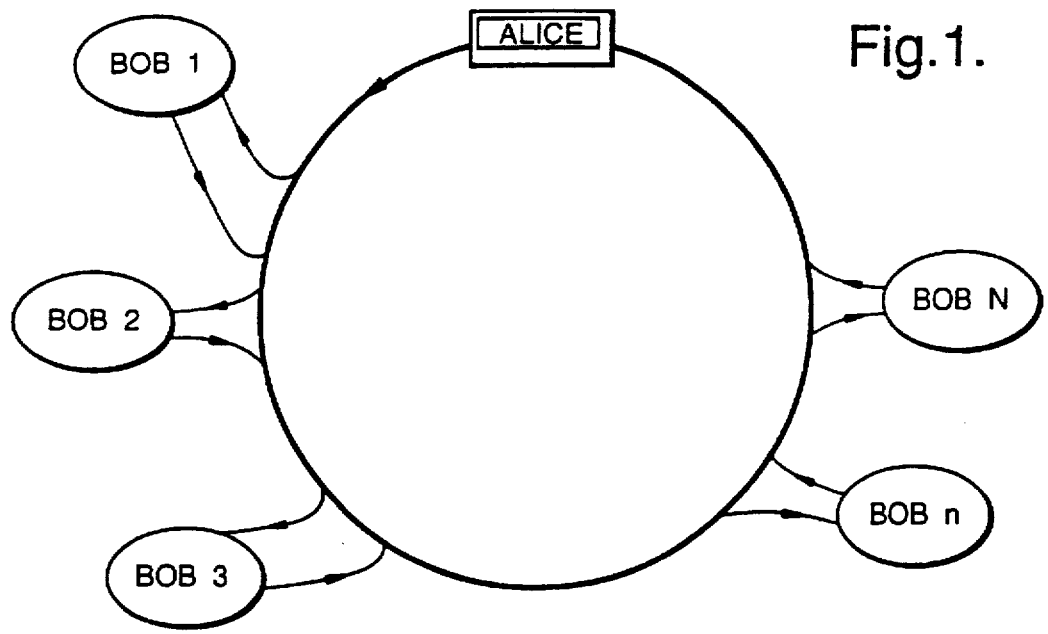
FIG. 1 is a diagram showing schematically a network embodying the present invention.

As shown in FIG. 1, a communications network 1 has a ring topology. A number of users Bob(1) ... Bob(N) are connected in series around the network. A further user, conventionally designated Alice, is also connected to the network. Alice includes a source and a detector for single-photon signals. In practice, the network may be, for example, a fibre-based computer LAN. In this case Alice is typically the network server, and the other stations Bob(1) ... Bob(N) are client stations.

In use, the single-photon signals produced by Alice are used to carry a quantum channel which is used for quantum-key distribution. At any one time, a selected pair of users, e.g. Bob(1) and Bob(2), access the quantum channel to establish a shared secret key. Alice transmits onto the network a number of single photons in a predetermined known state. Bob(1) and Bob(2) each in turn independently and randomly modulate these photons to change their quantum states. For example they might perform a polarisation rotation. Alternatively this system might be arranged to use phase modulation. The signal then passes around the network without further modulation by the other stations and is received back by Alice. Alice compares the quantum states of the photons as transmitted and received. She publishes, i.e. communicates to the users Bob(1) ... Bob(N) connected to the network, whether in a given time slot the photon she measured agreed or disagreed with the photon state she originally transmitted. From this information, and the knowledge of their private modulation settings for each time slot, Bob(1) and Bob(2) can infer the setting of each other's modulator. By a convention agreed between the users of the system, different modulator settings are associated with different bit values, and so by inferring the setting of each other's modulators, Bob(1) and Bob(2) can determine a random bit string. As with conventional quantum cryptographic systems, Bob(1) and Bob(2) can then enter a public discussion phase, in which they publicly communicate the determined values and actual modulator settings for a sample of the data (the data being discarded after this test is performed). Any eavesdropper intercepting transmissions on the quantum channel can then be detected by the presence of discrepancies above a certain noise threshold in the sampled data.

Appropriate protocols for this process are discussed in further detail below.

Figure 5:
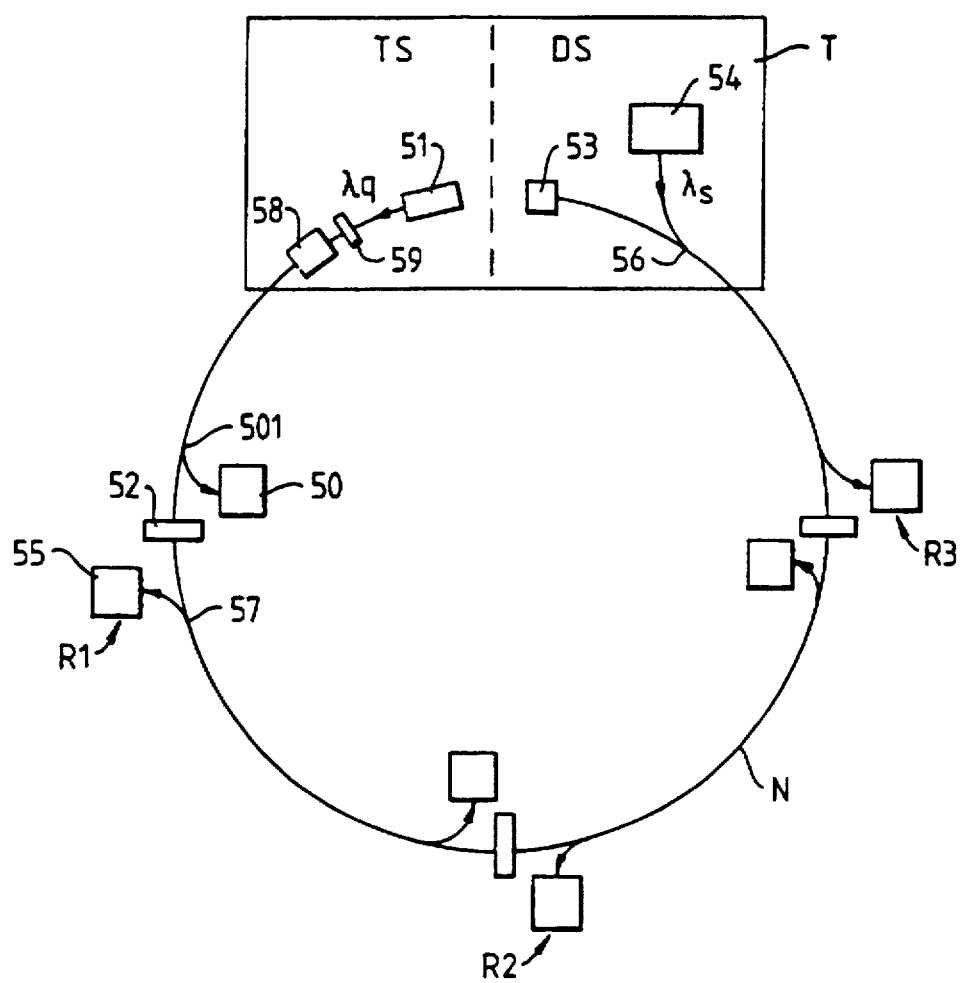
FIG. 5 shows in further detail a network embodying the topology of FIG. 1.

FIG. 5 shows in greater detail appropriate devices for implementing the system.

As shown in FIG. 5, a communication system comprises a transmitter or exchange T (corresponding to Alice in FIG. 1) connected to three receivers R1–R3 (corresponding to Bob(1) to Bob(3)) via a passive optical network N having a ring topology. The transmitter T includes both a quantum channel source 51 and also a conventional intensity-modulated source for outputting a signal carrying conventional traffic. The quantum channel source 51 and standard source 54 operate at different wavelengths $\lambda_q$ and $\lambda_s$ respectively. The output from the quantum source 51 passes through a switchable attenuator 59 and a polariser and band-pass filter 58 tuned to the quantum channel wavelength $\lambda_q$.

Figure 4:
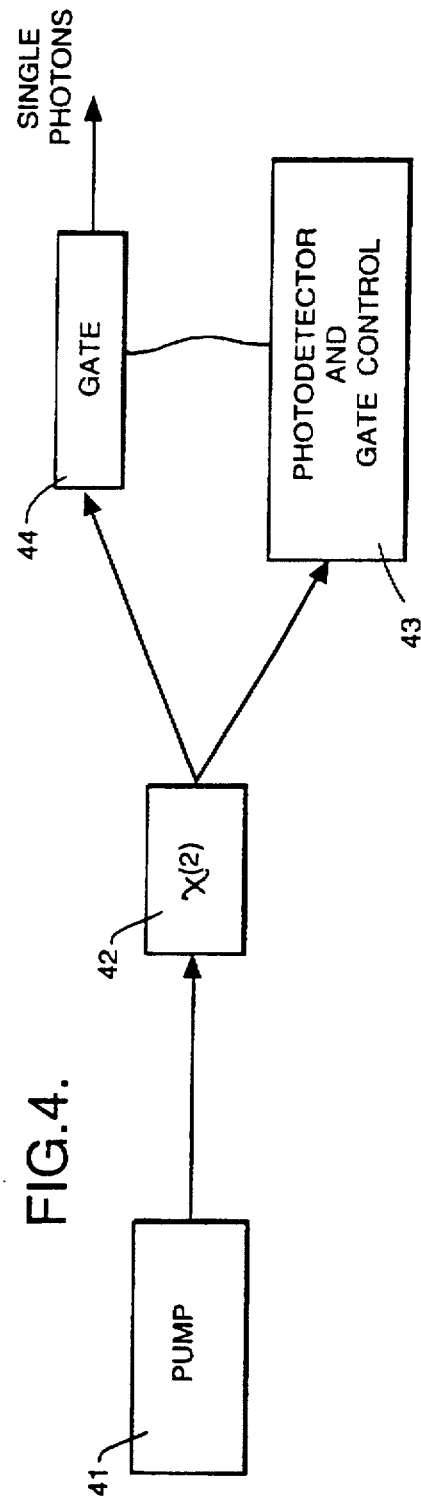
FIG. 4 shows a single-photon source.

FIG. 4 shows in further detail the quantum channel source 51. A laser 41 which may be, e.g. a Ti:sapphire at 750 nm, is used to pump a non-linear crystal 42, e.g. KDP. The parametric down conversion affected by the crystal produces correlated twin beams of photons at 1.5 μm. The photons in one beam are detected by a photodetector 43 and this triggers a gate 44 which opens a shutter to let through a single photon.

Alternative constructions for the quantum channel source 51 are possible. In particular, a laser diode may be used, with the output from the diode highly attenuated so that in general no more than one photon passes from the source in any given time slot, and on average the intensity from the source is very much less than one photon per time slot.

Each receiver comprises a first standard detector 55 for the signal channel on $\lambda_s$, a detector 50 for multi-photon timing signals at the quantum channel wavelength $\lambda_q$, and a modulator 52, which in the present example is a polarisation modulator. The clock detector 50 is connected to the network N by a fibre coupler 501 which provides a weak tap at $\lambda_q$. The detector 55 for the signal wavelength is connected to the network by a WDM (wavelength division multiplexer) coupler 57. The WDM is a fibre coupler with a wavelength-dependent coupling characteristic. In the present case, the WDM ideally provides a straight-through route for the quantum channel, i.e. the coupling fraction out of the loop is small at $\lambda_q$, whilst at the signal wavelength $\lambda_s$ the coupling fraction has a much larger value $f_s$. Appropriate values are discussed below.

The users establish keys using the protocol outlined above. At the start of this process, the system is initialised by outputting a multi-photon timing and calibration signal on the quantum channel wavelength $\lambda_q$. The timing and calibration processes are described in further detail in the above-cited co-pending international applications. Each receiver monitors these timing/calibration pulses via a weak tap and a standard (i.e. multi-photon) detector 50 and thereby synchronizes its local clock with the transmitter. A detector system 53 in the transmitter includes a single photon detector which in the present example is an avalanche photodiode APD. Other detectors sensitive to single photons may be used, e.g. a photomultiplier tube. The APD is at this stage weakly biased in order to reduce its sensitivity and thereby avoid saturation effects from the multi-photon pulses. The output of this detector is monitored in order to linearise the polarisation state at the output of the ring using the polarisation controller 61, FIG. 6.

As an alternative to a separate initial timing/calibration phase, timing information may be sent concurrently with the quantum key information, by increasing the intensity of every $p^{th}$ pulse (using the attenuator 59) to a level that is detectable by the clock detectors 50. It may be necessary to blank the single photon detector during each timing pulse slot to avoid saturation problems. This may be achieved either by reducing the sensitivity of the detector, e.g. by reducing the reverse bias to the APD, or by means of a second switchable attenuator 59 connected in-line with the single photon detector. Consequently, there will be a lower limit on p since ideally the single photon detector should receive many single photon pulses for each timing pulse, and an upper limit determined by the stability of the local oscillators in each receiver. Alternatively, the concurrent timing data may be sent using a separate wavelength and WDM techniques to achieve isolation of the quantum channel, or over a separate network or channel which may be either optical or electronic in nature.

Subsequently to the timing/calibration the attenuator 59 is switched on to attenuate the source so as to produce a single-photon output. Linearly polarised single photons are then transmitted onto the network. At selected receivers, the single-photon signal is modulated using a randomly chosen polarisation base, e.g. the rectilinear (0°, 90°) or diagonal (−45°, +45°) polarisation states. The receiver records the state used in each time slot. The modulator used in the receiver may take the form of a solid-state or a liquid crystal-based Pockel's cell, for example.

After passing through the modulator, the single-photon signal travels on and is again received back at the transmitter. There the transmitter detects the returned photon, and registers a 1 or a 0 depending upon the detected polarisation state.

Figure 6:
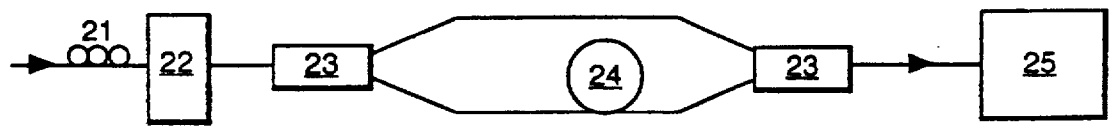
FIG. 6 is a single-photon detector.

In the present embodiment, the single photon detector system referenced 53 in FIG. 5 has the structure shown in FIG. 6. A polarisation splitter/combiner 23 outputs a photon from one or other of its ports depending on the photon's polarisation state. Rather than using a separate APD for each output port, a single APD 25 is used connected to the splitter/combiner by a network providing paths of different lengths for the outputs of the different ports. The APD may be a silicon or germanium APD such as the SPCM-100-PQ (GE Canada Electro Optics) or the NDL5102P (NEC). The APD has sufficient time resolution to distinguish the delay when a photon arrives via the longer path, and hence each photon is registered as a 0 or a 1 depending upon when it arrives during the clock period. The recombination of the two paths can be performed with very little loss using a second polarisation splitter coupler which now acts as a 2-into-1 polarisation combiner. An appropriate polarisation splitter coupler is the JDS PB100. When used as a combiner it gives a loss of around 0.6 dB. Alternatively a standard 50/50 polarisation independent coupler such as the Sifam P2S13AA50 could be used for recombination of the two paths, but this leads to a 3 dB loss penalty.

Polarisation couplers such as the JDS PB100 are 1-into-2 fibre couplers which separate the two orthogonal polarisation modes of the input fibre into two output fibres with the horizontal mode in one fibre and vertical in the other. This is functionally equivalent to a bulk-optics polariser such as a Wollaston prism. If the direction of input to a polarisation splitter is reversed, then a horizontally polarised state in one fibre can be coupled to a vertical state in the other fibre to form a low loss 2-into-1 coupler.

After the transmission of a number of such single-photon signals a "public" discussion phase is carried out. It may take place on a separate optionally non-optical network, or as in this embodiment, on the same network as the other steps. Practical quantum channels will suffer from unavoidable background error rates due to detector dark counts, and environmentally-induced fluctuations in the polarisation (or phase) state in the fibre etc. In this case the public discussion phase contains an additional stage of error correction and so-called "privacy amplification". This both ensures that both users Bob(1) and Bob(2) end up with identical keys and that any key information leaked to an eavesdropper is an arbitrarily small fraction of one bit. This procedure is outlined in C. H. Bennett, F. Bessette, G. Brassard, L. Salvail and J. Smolin: "Experimental Quantum Cryptography", J. Cryptology, 5, 3 (1992).

In the example shown in FIG. 5, standard signal traffic is carried on the network using a second wavelength $\lambda_s$. This data is intensity-modulated and is accessed at each receiver via a WDM coupler that ideally has coupling ratios of 0 and x at wavelengths $\lambda_q$ and $\lambda_s$ respectively, where x is determined to meet the criterion that all receivers on the network require a measurable signal. The data transmitted on the signal channel may be encrypted using the keys distributed over the quantum channel. A fresh key may be transmitted periodically, to maintain security.

In the embodiments discussed above with reference to FIG. 5, the single photons are transmitted in the opposite direction to the multi-photon signal pulses. This is not essential, however, bi-directional transmission helps to isolate the two channels by exploiting the directionality of the fibre couplers to minimise the number of signal photons incident on the quantum channel single-photon detector. The necessity for such isolation will depend on the relative sensitivity of the single-photon detector at the quantum and signal channel wavelengths ($\lambda_q$ and $\lambda_s$), and on whether the two channels are required to operate at the same times. However, since the power in the signal channel is likely to be $-10^6$ times that in the quantum channel, it is necessary to consider the possibility that the signals could readily saturate the single-photon detector and hence generate errors in the quantum transmission. Therefore, isolation of the two channels is likely to be increased by the use of a WDM coupler and/or an in-line filter in front of the single photon detector, which passes $\lambda_q$ but strongly attenuates $\lambda_s$. (Note that component 58 in FIG. 5 already contains such a filter to isolate the quantum channel source from the signal channel). The degree of attenuation required at $\lambda_s$ will be increased if the signal and quantum channels are transmitted unidirectionally, but will still be achievable using the above cited methods. Appropriate fibre filters can be based upon fibre-gratings made using photo-refractive techniques.

Figure 9A:
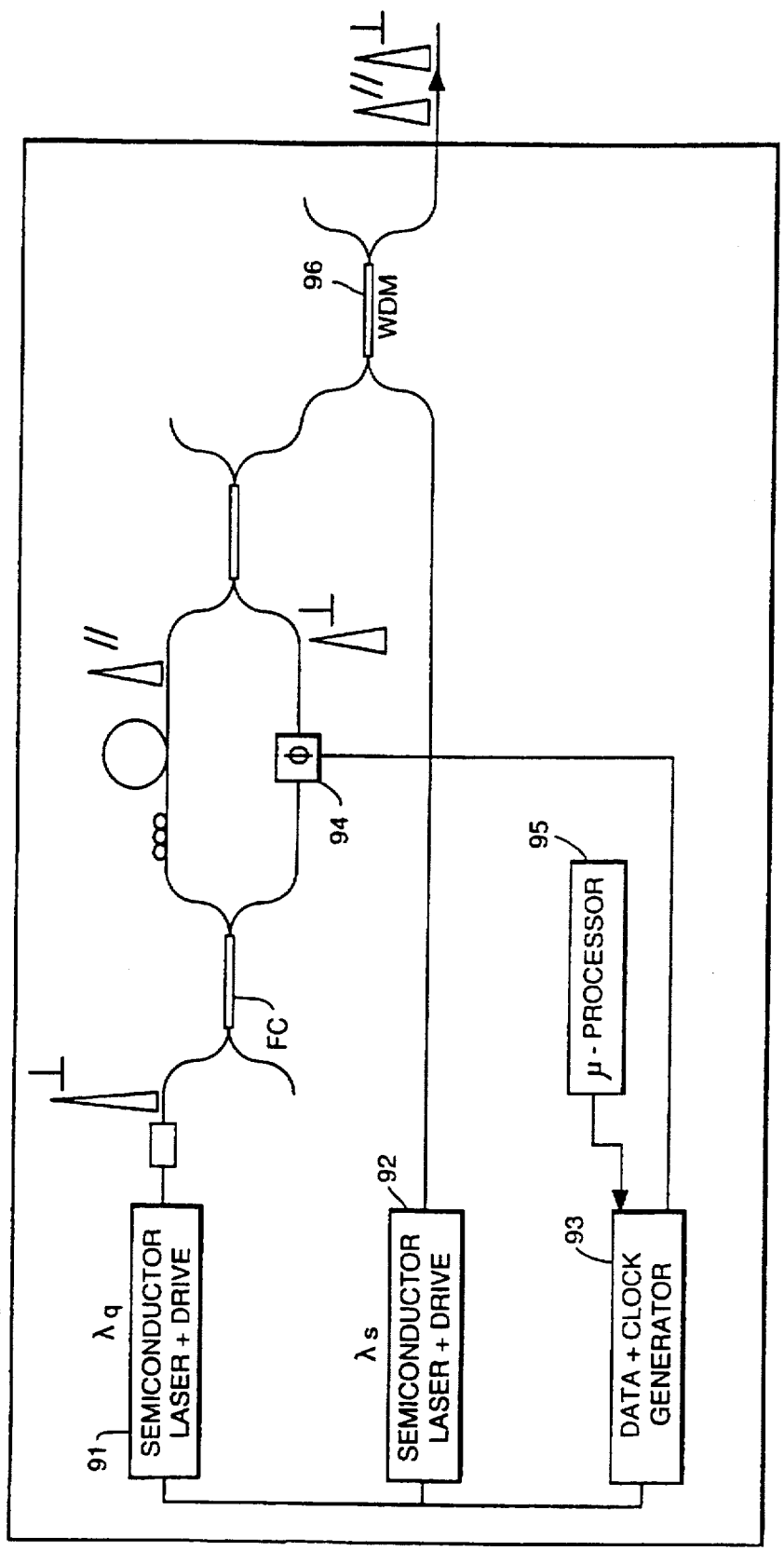
FIGS. 9a and 9b are transmitter and detector stages for use in an embodiment using phase encoding.
Figure 9B:
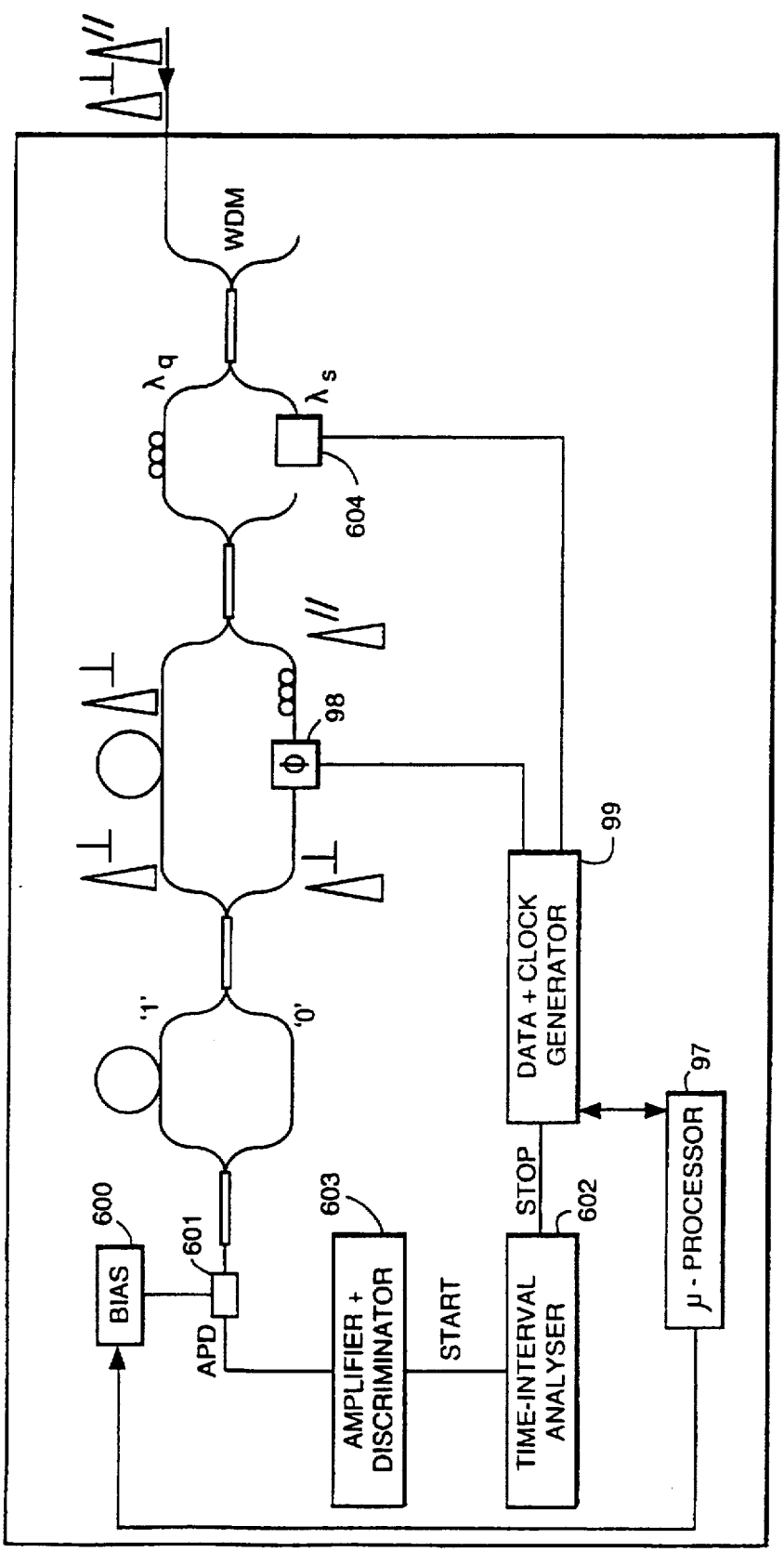

An alternative embodiment encodes the single photon signals on the quantum channel using phase modulation rather than polarisation modulation. In this embodiment, the transmitter stage and detector stage of FIGS. 9a and 9b are substituted for the transmitter stage TS and detector stage DS of the transmitter/exchange T of FIG. 5. In the transmitter output stage of this embodiment, a first pulsed semiconductor laser 91, operating at a first wavelength $\lambda_q$, where, e.g., $\lambda_q$=1300 nm provides the optical source for the quantum channel. The laser 91 and a modulator driver 93 for a phase modulator 94 are controlled by a microprocessor 95. The phase modulator 94 is located in one branch of the transmitter. A polarisation controller PC (e.g. BT&D/HP MCP1000) is located in the other branch of the transmitter. A second semiconductor laser 92 provides a bright multi-photon source at a wavelength $\lambda_s$ where, e.g., $\lambda_s$=1560 nm. This signal is used for timing and calibration as described above. The signal at $\lambda_s$ is coupled to the output of the transmitter via a WDM coupler 96 which may be, e.g. a JDS WD1315 series device.

As an alternative to the use of separate sources for the quantum channel and the timing signal, a single semiconductor laser may be used feeding its output via a fused fibre coupler FC to two different branches, one including an attenuator, and the other branch being unattenuated. An optical switch may then be used to select either the bright or attenuated output. Depending upon the frequency requirement, either a slow electro-mechanical device such as the JDS Fitel SW12 or a fast electro-optic device such as the United Technologies Photonics YBBM could be used.

In the receiver of this embodiment, a respective control microprocessor 97 controls the receiver phase modulator 98 via a modulator driver 99. The receiver control processor also controls a detector bias supply 600 for the receiver single-photon detector 601. In both the transmitter and the receiver, where the signal path branches, fused-fibre 50/50 couplers are used. Suitable couplers are available commercially from SIFAM as model P22S13AA50. The timing signal at $\lambda_s$ is detected by a PIN-FET receiver 604.

Appropriate phase modulators 94, 98 for the data encoding and decoding are lithium niobate or semiconductor phase modulators operating at, e.g., 1-10 MHZ. An appropriate lithium niobate device is available commercially as IOC PM1300. Phase modulators of the same type may also be used in each receiver, substituted for the polarisation modulators 52 of FIG. 5. An appropriate driver for the phase modulators is a Tektronix AWG2020, and this can also be used as a clock generator for the system. For the single-photon detectors, APDs as discussed above with reference to FIG. 5 may be used. As a further alternative, the phase modulators may be liquid crystal-based Pockel's cell. The modulator may be a chiral Smectic -C LC cell, or a stack of such cells, as described in our above-cited co-pending international application (ref: 80/4541/03).

Significant improvements could be obtained by combining the phase modulators and fibre devices shown in FIGS. 9a and 9b into single integrated structures. Variations on the current design or that discussed in P. D. Townsend, J. G. rarity and P. R. Tapster, Elect. Lett. 29, 634 (1993) could be integrated onto a lithium niobate chip with the fibre paths replaced by waveguides and the modulator region defined by electrodes as in a standard device. Alternative fabrication methods include e.g. photo-refractively-defined planar silica waveguide structures or semiconductor waveguide structures. In general, integration should lead to improved stability and compactness for the transmitter and receiver structures. In particular, this embodiment uses an NEC 5103 Ge APD cooled to 77K using, e.g., Hughes 7060H cryocooler or a liquid nitrogen dewar or cryostat. In the receiver in this embodiment, just a single APD is used with the signals corresponding to the different branches of the receiver being separated in time by virtue of a delay loop in the upper branch labelled "1". The key distribution protocol requires each received photon to be associated with a given clock period and also identified as a 0 or 1 depending upon which branch of the receiver it comes from. These functions are performed by a time interval analyser 602 (e.g. Hewlett-Packard 53110A). The start signals for this device are provided by the APD output after processing by a circuit 603 comprising an amplifier and discriminator which may be respectively, e.g. Lecroy 612 and Lecroy 821.

The timing signal referred to above may take the form of either a single trigger pulse, which is then used to initiate a burst of key data on the quantum channel, or as a continuous stream of pulses at the system clock frequency which are used to re-time the receiver clock between key transmissions. Before key transmission commences, the receiver varies the phase modulator DC bias level in order to zero the phase shift in the interferometer (i.e. photon transmission probability is maximised at one output port and minimised at the other). FIGS. 9a and 9b also show the relative spatial, temporal and polarisation changes experienced by the two components of a quantum channel pulse as they propagate through the transmitter and receiver. If all fibres in the system are polarisation-preserving then no active polarisation control or static polarisation controllers are required in the system. However if standard fibre is used for the transmission link then active polarisation control will be required at the input to the receiver. This can be performed using a standard detector, feedback circuit and automated polarisation control as described in our co-pending International application PCT/GB93/02637 (WO94/15422).

Figure 7:
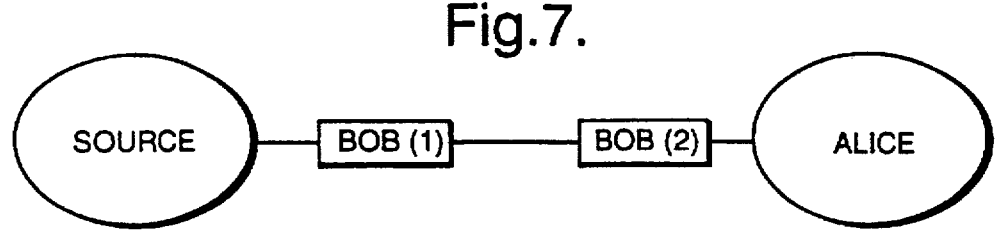
FIG. 7 is a diagram shown schematically an alternative network topology.

Although the embodiments so far described all use networks having a looped-back path from Alice via the two Bobs and back to Alice, the invention is not limited to use with such network topologies. For example, as shown in FIG. 7, the invention may be implemented on a linear network. In this case, the single-photon source is located remotely from Alice. The source prepares photons in a known predetermined state and they then pass in series through the modulators controlled by Bob(1) and Bob(2) before being detected by Alice. Alice uses a single-photon detector and measures in a known basis. She then publishes her results to the two Bobs to establish a mutual secret key using the method described above.

Figure 8:
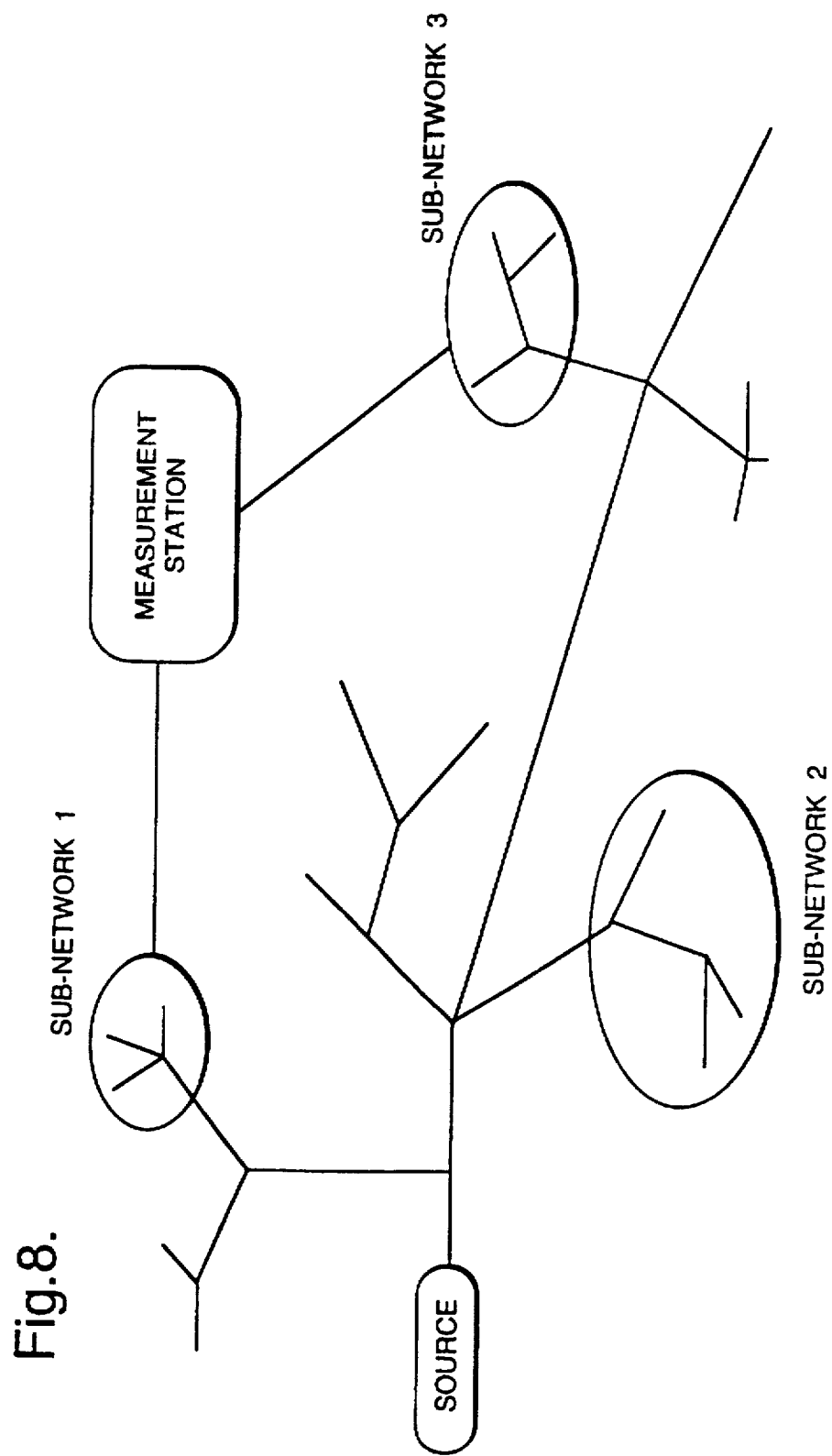
FIG. 8 is a diagram of a branched multiple-access network.

Our co-pending international application filed this day and entitled "QUANTUM CRYPTOGRAPHY ON A MULTIPLE ACCESS NETWORK" describes and claims multiple-access networks including networks using a tree topology. The scheme described above with reference to FIG. 7 can be applied to such tree-networks to allow the receivers in such networks to operate using modulators, rather than single-photon detectors. As shown in FIG. 8, this is done using a network including a single-photon source which now rather than simply outputting photons in a single predetermined state modulates the photons using a random data stream. The source used in the network of FIG. 8 is then equivalent in effect to the combination of the source of FIG. 7 and Bob(1), the first modulating station. The receiver stations on each sub-network then modulate the received single-photon signal and pass it on to a measurement station connected to the different receiver stations by, for example, a linear optical bus. The measurement station then publishes the results of its measurements.

In practice, both the source and the measurement station are likely to be controlled by the exchange (or by the server in a LAN implementation) and so this technique provides an alternative method for establishing a key between the user Bob and the exchange. This may be extended to the establishing of mutual keys between different users Bob(1), Bob(2) on the network if after establishing a secret key with the exchange, that key is used in the encryption of a further key transmitted from the exchange to the selected two users. In these circumstances the users have secrecy from each other, but the exchange still controls access to the keys.

In general, for there to be universal key sharing between a multiplicity of users, and without the exchange having access to the keys, then the network must have a ring configuration or an equivalent topology. For example, a sub-network such as those shown in the branches of the network of FIG. 8 may be substituted for each user in the topology of FIG. 1.

Examples of protocols suitable for use in embodiments of the present invention will now be described in further detail.

The original protocol developed in the early 1980s [1,2] and experimentally demonstrated by a team based at IBM [3] uses a coding scheme based on four quantum states. For convenience, we shall use the spin notation to describe a quantum system with a Hilbert space dimension of 2. Thus photon polarisation, for example, can be represented in this notation. The four states employed in the original protocol and their expansions are given by $$|\pm>_z = \frac{1}{\sqrt{2}} (|+>_x \mp |->_x) \quad (2.1)$$

$$|\pm>_x = \frac{1}{\sqrt{2}} (\pm|+>_z + |->_z)$$

The "+" states, or the "spin-up" states represent a logical "1" and the "−" states or the "spin-down" states represent logical "0". The two states labelled by the suffix "Z", for example, span the 2-dimensional Hilbert space and form an orthonormal basis. Thus by using the Z-basis a single binary digit can be encoded. The Z and X bases are conjugate so that if the bit is encoded in the Z basis a measurement designed to read a bit encoded in the X basis will yield a probabilistic result. A measurement designed to read a bit in the Z basis will yield the correct result with certainty (assuming, of course, perfect measurement efficiency). Furthermore, once a measurement has been performed the state is projected into an eigenstate of the measurement observable so that if the wrong measurement is made recovery of the initial bit is, in principle, impossible.

These basic quantum results can be exploited to give a secure QKD (Quantum Key Distribution) by application of the following protocol (the BB84 protocol [2,3])

Alice prepares a photon in one of the four possible states (2.1) chosen at random. This photon is sent to Bob who chooses to measure, at random and independently of Alice, along one of the spin (polarisation) directions. Both Alice and Bob record their choices and results of measurement.

Bob publicly announces which basis he chose to measure for each of the photons he received, but not the result (that is, a "1" or "0"). Alice compares this with the list of bases she used and the results from any photon prepared and measured in different bases is discarded (or rejected).

In the absence of any eavesdropping Alice and Bob should, in a perfect error free system, have identical copies of data (that is, an identical binary sequence). They now need to check for any eavesdropper and they do this by selecting a random subset of data from their list and publicly comparing them. Any attempt at eavesdropping will have unavoidably corrupted Bob's sequence and will be revealed upon comparison.

Having performed an estimation of the error-rate on their data by public comparison Alice and Bob can, if the error is not high (around 10% is thought to be a realistic limit), enter into a public error-reconciliation protocol [5] to correct the errors in their data. This inevitably sacrifices some bits which must be discarded.

Having performed their reconciliation procedure they adopt another protocol known as privacy amplification [6] to reduce the possible amount of information an eavesdropper possesses about their joint sequence. After this procedure Alice and Bob can be sure, to a very high confidence level, that they have an identical and secret sequence of data which can then be used as a key.

The above protocol describes how two users, Alice and Bob can establish a secret key using the properties of single photons. The configuration envisaged is that of a simple link between Alice and Bob. If Bob(1) and Bob(2) are two users hanging off a looped-back network who wish to establish a secret key with each other and Alice is the broadcaster and supplier of single photons (see FIG. 1) this protocol is altered. Furthermore, the equipment Bob(1) and Bob(2) use is different to that required in the straight linear link between Alice and Bob.

We consider the implementation of a BB84-type protocol on a looped-back network in which Bob(1) and Bob(2) wish to establish a secret key. Alice supplies a sequence of single photons onto the network in definite states (in this case we shall assume that she transmits photons in the $|+>_z$ state). Bob(1) will, in each time slot, perform one modulation chosen at random from a set of 4 possible modulations (in this case a rotation of the spin direction, but this can also be a phase modulation or a rotation of polarisation depending on the specific implementation of QKD chosen). The result of this modulation will be to put the photon in one of the four states (2.1) which then travels onto Bob(2). Bob(2) performs a modulation for each time slot also randomly chosen from a set of 4 (Bob(1) and Bob(2) must choose independently, i.e. have an independent source of random numbers). The result of this second modulation is to change the state of the photon once more which then travels on round the network and eventually back to Alice who measures in her original transmission basis (in this case the Z basis). If she obtains the result "1" she will broadcast publicly the message "agree" on the network and if she obtains the result "0" she will publicly broadcast the message "disagree". Bob(1) and Bob(2) by publicly announcing which class of transformation they used (but not their actual modulation setting) can now infer from this data a secret key. It is crucial that the modulation settings of both Bobs remain secret as access to one will render an eavesdropper able to recover the key.

If Alice transmits the $|+>_z$ states onto the network then the transformations Bob(1) must perform to generate the set of states (2.1) are as follows $\hat{U}_1 = \hat{I}$ (the identity)

$$\hat{U}_2 = \exp\left(-\frac{i\pi}{4} \hat{\sigma}_Y\right) \left(\text{rotation by } \frac{\pi}{2}\right) \quad (2.2)$$

$$\hat{U}_3 = \exp\left(-\frac{i\pi}{2} \hat{\sigma}_Y\right) (\text{rotation by } \pi)$$

$$\hat{U}_4 = \exp\left(-\frac{i3\pi}{4} \hat{\sigma}_Y\right) \left(\text{rotation by } 3\frac{\pi}{2}\right)$$

where $\hat{\sigma}_y$ is the operator representing a spin along the Y axis. The effect of these transformations on the photon supplied by Alice is as follows $\theta_1 |+>_z \rightarrow |+>_z$ $\theta_2 |+>_z \rightarrow |+>_x$ $\theta_3 |+>_z \rightarrow |->_z$ $\theta_4 |+>_z \rightarrow |->_x$ \quad (2.3)

so that the output states from Bob(1) are the 4 states that occur in the original BB84 protocol. We shall group the transformations $\hat{U}_1$ and $\hat{U}_3$ together, and similarly we shall group the transformations $\hat{U}_2$ and $\hat{U}_4$ together. The effect of the first two transforms is not to change the basis but to either leave alone or perform a spin-flip on the state of the photon. We shall call this group of two transforms the "F" group (flips spin or otherwise). The effect of the second pair of transformations is to change the basis and we shall call this group the "C" group (changes the basis).

Figure 2:
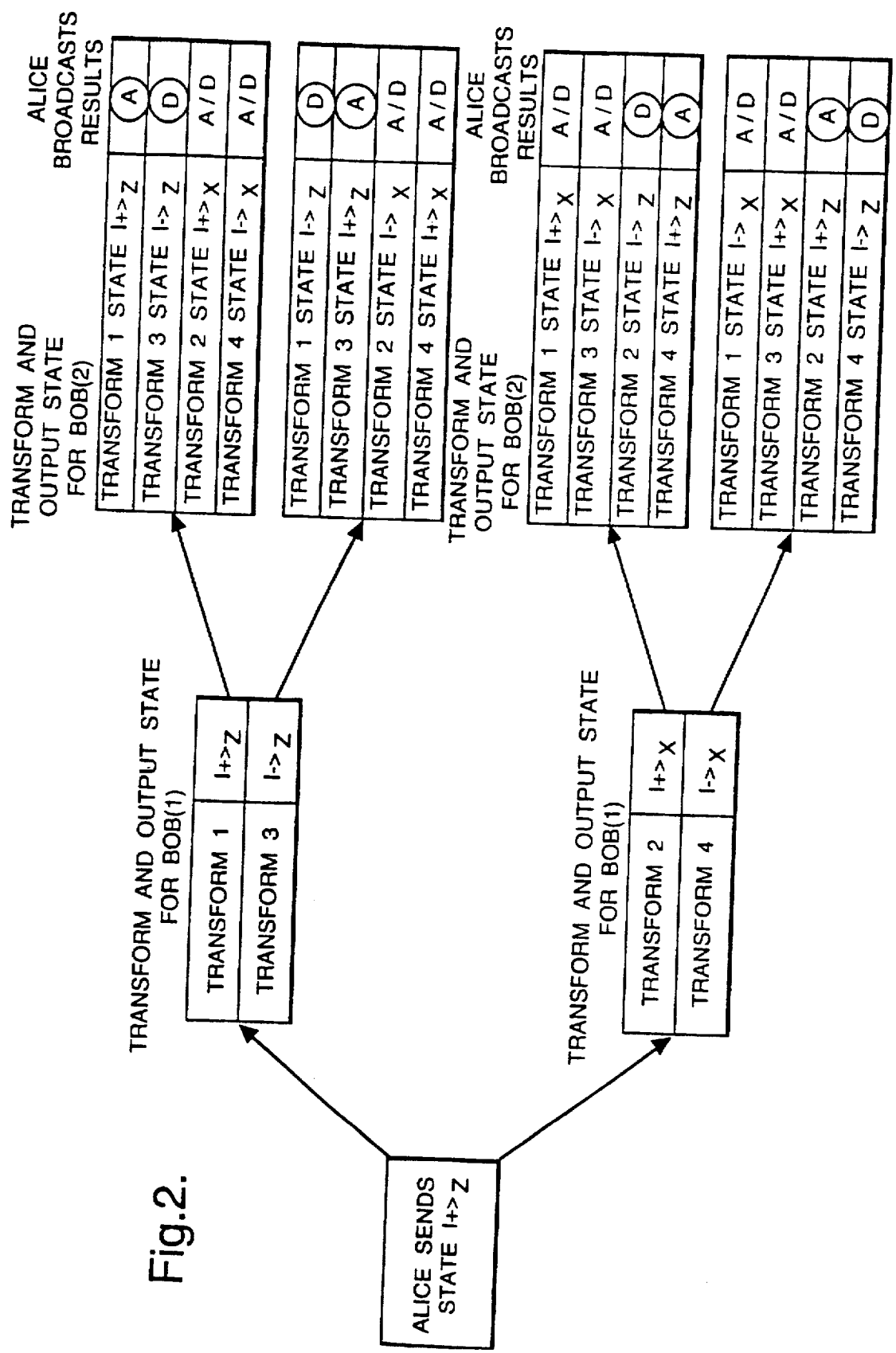
FIG. 2 shows a four-state protocol for use with the network of FIG. 1.

Bob(2) performs one of the transformations (2.2), chosen at random, on an incoming photon which then travels on round the network to Alice. Alice measures in her original basis (the Z basis) and if the result agrees with the bit originally sent (i.e., it is a logical "1") she broadcasts the message that for the relevant time slot the result was "agree". If the result of her measurement was a logical "0" she broadcasts the message "disagree". Bob(1) and Bob(2) now publish which group of transformations they used (i.e., whether they used a "C" or "F" transformation), but not which particular transformation in that group was used (i.e., they do not reveal whether the transform was $\hat{U}_1$ or $\hat{U}_3$, for example). An example of how this works is shown in FIG. 2 and described in the accompanying discussion.

We shall, as above, assume that Alice sends photons onto the network prepared in the state $|+>_z$ (Bob(1) and Bob(2) can always check whether Alice is cheating at a later stage). Bob(1) chooses one of the transformations (2.2) at random, uses it to modulate the incoming photon from Alice, and sends it on to Bob(2). The output state from Bob(1) is one of the four states used in the BB84 protocol [2, 3] and these are given by (2.3). Bob(2) also chooses one of the four transformations (2.2) at random and independently of Bob (1). He modulates the incoming photon from Bob(1) with this transformation and sends it on to Alice (in practical terms choosing a transformation from the set (2.2) can be as simple as selecting a voltage on a voltage driver and using this to set a phase shift in a phase modulator, a particular voltage setting corresponding to one of the four transformations). The effects of these transformations on the output states of Bob(1) are as follows:

$$O_1 |+>_z \to |+>_z \; O_1 |+>_x \to |+>_x \quad (2.4)$$

$$O_2 |+>_z \to |+>_x \; O_2 |+>_x \to |\mp>_z$$

$$O_3 |+>_z \to |\mp>_z \; O_3 |+>_x \to |\mp>_x$$

$$O_4 |+>_z \to |\mp>_x \; O_4 |+>_x \to |+>_z$$

Alice now measures the incoming photon in the basis of transmission and publishes the result "agree" or "disagree", labelled by "A" or "D", respectively, on FIG. 2. The result "A/D" is to be read that either "agree" or "disagree" is equally likely. Bob(1) and Bob(2) now broadcast which group of transformations they used (that is, either a "C" or "F" transformation), but they do not reveal which particular transformation of the group they chose. They discard all instances in which they chose a different group. From Alice's result and knowledge of their own transformations Bob(1) and Bob(2) can infer, from the probability tree in FIG. 2, what setting the other Bob used. For example, in FIG. 2 if Bob(1) and Bob(2) have used the F group, that is the transformations 1 and 3 then the result "A" from Alice implies that either (1,1) or (3,3) were used. If the result "D" was broadcast by Alice then either (1,3) or (3,1) were used (the notation here meaning (Bob(1) 's transformation, Bob (2)'s transformation). Only Bob(1) and Bob(2) possess the knowledge to determine whether (1,1) was the setting for the result "A" or whether the result occurred from the transformations (3,3). If Bob(1) and Bob(2) adopt the coding convention that Bob(1)'s transforms 1 and 2 are to be taken as a logical "1" and his transforms 3 and 4 are to be taken as a logical "0" then at the end of this procedure Bob(1) and Bob(2) will have an identical secret binary sequence (in the absence of any errors and eavesdropping). For example, if Alice publishes the result "D" and the F group of transforms have been used then either (1,3) or (3,1) were the transforms chosen by Bob(1) and Bob(2), respectively. Because they each know their individual modulation settings they can choose between these possibilities so that if they infer (1,3) they read this as a logical "1" and if they infer (3,1) they read this as a logical "0". In FIG. 2 the results that can be used to establish a secret key are ringed. Clearly this coding scheme is not unique and there are other obvious options for Alice. For example if she chooses to measure in the X basis then an alternative set of results become useful for Bob(1) and Bob(2) and a different protocol must be adopted (this amounts to a trivial and obvious change in that the Bobs keep only those results for which they used a different group of transformations). If Bob(1) and Bob(2) now publicly compare a randomly chosen subset of their key data they can check for errors and detect eavesdropping or a dishonest Alice.

The above is a description of how the protocol works. The protocol is as follows:

For each time slot Alice sends a single photon or no photon (with high probability, that is the probability of sending two or more photons in any one time slot is low) onto the network in a known state.

For each time slot Bob(1) and Bob(2) choose randomly, and independently, one of the four transformations (2.2) and modulate the photon which arrives. They record, for each time slot, which modulation setting was chosen.

Alice measures in a known basis and publishes the result on the network.

Bob(1) and Bob(2) publish which group of transformations they used but not which particular transformation of that group. They then discard the data for which a probabilistic outcome is expected and adopt an appropriate coding scheme for the remaining data (that is, for example, the sequence of transformations (1,3) is to be interpreted as a logical "1").

Bob(1) and Bob(2) take a random subset of this data and publicly compare the actual transformations they used for this data with the published results of Alice. From this comparison they can establish an error rate in their key data.

If this error rate is not too severe Bob(1) and Bob(2) can then proceed with the reconciliation and privacy amplification protocols [3,5–7] to establish a key secret to within very stringent confidence levels.

Because an eavesdropper does not know the actual basis at any stage of the process she cannot perform a measurement that does not affect the result published by Alice. For example, Eve could choose to measure either between the Bobs or between Bob(2) and Alice, or indeed she could choose to measure (and, of course, resend) at both points. However, she cannot know which output state emerges from Bob(1) and her intervention at this point will inevitably corrupt the data. Similarly, she cannot know the result of Bob(2)'s transformation and her intervention after Bob(2)'s point in the network will render the transmission unreliable.

An examination of the network diagram will quickly show that the situation is topologically equivalent to the straight link envisaged in the BB84 protocol. The functionality of the looped-back network is, however, entirely different in that many users can each establish pairwise secret keys, the single photons distributed and measured from a single source. Given this topological equivalence we should expect that each of the QKD protocols so far developed can be adapted for use on the looped-back network. As we shall show this is indeed the case and we briefly describe the implementation of each of these protocols in the following sections. As a final point it should be noted that the choice of transformations and coding schemes is not unique and any moderately competent quantum cryptographer should be able to generate a multiplicity of schemes based upon the central idea of performing unitary transformations on the state of an incoming photon on a looped-back network. This comment is also applicable to the other protocols to be discussed where the particular examples we give are to be taken as templates rather than as an indication of any preferred coding or transformation scheme.

Having described the relatively complicated structure of the 4-state protocol it is now quite easy to develop the 2-state version. The original 2-state protocol, B92, invented by Charles Bennett of IBM [8] is a little different to the version we describe here for the looped-back network. The basic philosophy behind our 2-state protocol is the same. Alice supplies a source of single photons on to the network in known states. Bob(1) and Bob(2) independently choose a transformation at random from a set of possible transformations (in the 2-state protocol only 2 transformations are required by each Bob) and modulate an incoming photon which then passes on round the network. Alice measures each incoming photon in a known basis and publishes the result of her measurement (i.e., whether she obtained a "1" or a "0"). This is sufficient for anyone with knowledge of one of the individual transforms used by the Bobs to construct the other. In this fashion Bob(1) and Bob(2) can establish a verifiably secret key after a small randomly chosen sample is publicly examined for errors. As with the 4-state protocol the QKD scheme for 2 states on a looped-back optical network is not unique and the version we present here is for illustrative purposes; any competent quantum cryptographer should be capable of constructing a myriad of similar 2-state protocols from the example we give.

For this example we shall assume that Alice transmits a sequence of single photons in the state $|+\rangle_x$. Bob(1) selects at random from one of two transformations, which we call transform 1 and transform 2, respectively. The unitary operators describing these transformations are as follows $$\hat{U}_2 = \exp\left(-\frac{i\pi}{4}\hat{\sigma}_Y\right)\left(\text{rotate by } \frac{\pi}{2}\right) \quad (3.1)$$

The effect of these transformations on the states supplied by Alice is $$\hat{U}_1|+\rangle_x \rightarrow |+\rangle_x$$

$$\hat{U}_2|+\rangle_x \rightarrow |+\rangle_z \quad (3.2)$$

Bob(1) records which transformation he chose and uses it to modulate the state of the incoming photon from Alice which then passes on round the network to Bob(2). Bob(2) now chooses at random from two transformations; the identity transformation $\hat{U}_1$ and $\hat{U}_3$ which is the inverse transformation of $\hat{U}_2$. The effect of these transformations on the incoming states from Bob(1) is given by $$\hat{U}_1|+\rangle_x \rightarrow |+\rangle_x$$

$$\hat{U}_3|+\rangle_z \rightarrow |+\rangle_z$$

$$\hat{U}_1|+\rangle_z \rightarrow |+\rangle_z$$

$$\hat{U}_3|+\rangle_z \rightarrow |+\rangle_x \quad (3.3)$$

Figure 3:
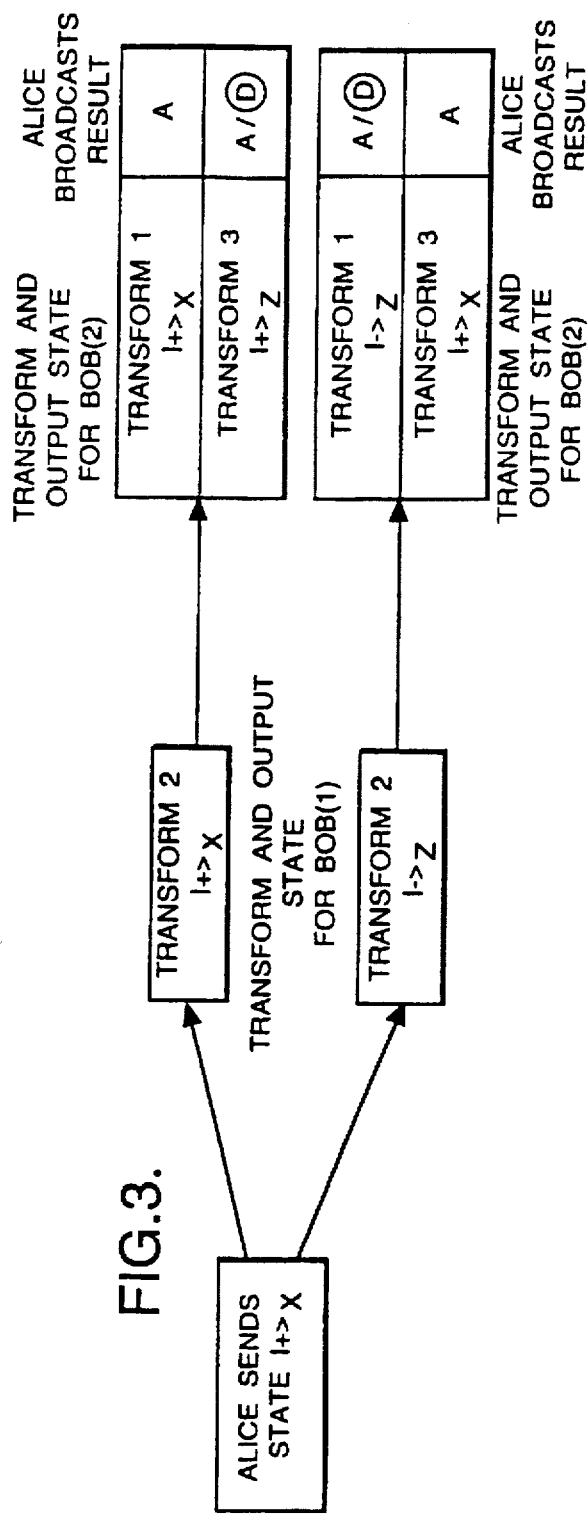
FIG. 3 shows a two-state protocol.

Bob(2) records which transformation he chose and modulates the incoming photon with the transformation and sends the photon on round the network to Alice who measures the photon in the basis of transmission. Alice publishes the result of her measurement which is either "agree" or "disagree". If the result is "disagree" then Bob(1) and Bob(2) can infer the other's modulation setting from knowledge of their own and can thereby establish a secret key. The probability structure of this scheme is shown in FIG. 3. A random sample of key bits can be publicly disclosed to test for an eavesdropper, these bits being subsequently discarded. An encoding scheme similar to that discussed above is employed so that, for example the sequence of transformations (1,3) is taken to be a logical "1" and the sequence (2,1) is taken to be a logical "0". The transformations here were deliberately chosen to be different to the transformations used in the BB84 protocol implementation discussed above. This is to emphasise the fact that there are many ways (in fact an infinite number) to choose transformations and measurements that give secure key distribution. For example, in the above case, Bob(2) could have chosen from precisely the same transformations as Bob(1). The crucial element is that there should be two distinct ways in which disagreement can be caused (or, indeed, agreements) so that if a disagreement (agreement) is found then Bob(1) and Bob(2) can establish a key. In the above case agreements do not convey any information as it is impossible to establish a unique pathway unless both transformations are known. As before, eavesdropping affects the statistics and will lead to disagreements where none are expected.

By extension, it can be seen from the above examples how to implement a rejected-data protocol (RDP) [9,10] on a looped-back network. Standard implementations of RDPs have been described and claimed in our pending application PCT/GB93/02075. For such RDPs to work at least 3 alphabets are required and we shall accordingly restrict our attention to 3-alphabet 6-state schemes. However, it should be emphasised that other variants are possible with the looped-back network configuration. These include RDPs with 4 alphabets and either 4 or 8 quantum states and, indeed, 3 alphabet schemes with 3 quantum states. This latter scheme being the 3 alphabet analogue of B92, for example. It is our contention that any single particle protocol can be implemented on a looped-back network configuration, thus making the looped-back network a powerful configuration for the design of a QKD network.

The 3-alphabet 6-state scheme relies on comparison of data that would not form part of any key. Bob(1) and Bob(2) look for deviations from their expected statistics. The properties of quantum mechanics guarantee that any eavesdropping attempt will change the statistics of this rejected-data. RDPs may become useful in assessing the quantity and kind of information available to an eavesdropper, an important procedure in the initial stages of error-reconciliation and privacy amplification [3,5–7]. As before Alice will supply single photons onto the network in well-defined and known states (as before a simple comparison of data will reveal a dishonest Alice). We shall take these states to be $|+\rangle_z$ for each photon. Bob(1) chooses at random one of 6 possible modulation settings and, recording his setting, modulates the photon and sends it on to Bob(2). As before, each modulation will put the photon into a new state (or leave it unchanged). Bob(2) performs an exactly similar operation except that his choice of transformation is independent of that of Bob(1) and sends the photon on to Alice who performs a measurement and publishes the result "agree" or "disagree". Bob(1) and (2) now publicly announce which group of transformations they used for each bit (cf. the 4 state protocol) but not which particular transformation from that group was chosen. In this example Bob(1) and (2) have 3 groups of transformations each containing 2 transformations making a total of 6 transformations in all. These transformations are given by $$\hat{U}_1 = I \text{ (the identity)} \quad (4.1)$$

$$\hat{U}_2 = \exp\left(-\frac{i\pi}{6}\hat{\sigma}_Y\right) \text{ (rotate by } 60°\text{)}$$

$$\hat{U}_3 = \exp\left(-\frac{i\pi}{3}\hat{\sigma}_Y\right) \text{ (rotate by } 120°\text{)}$$

$$\hat{U}_4 = \exp\left(-\frac{i\pi}{2}\hat{\sigma}_Y\right) \text{ (rotate by } 180°\text{)}$$

$$\hat{U}_5 = \exp\left(-\frac{i2\pi}{3}\hat{\sigma}_Y\right) \text{ (rotate by } 240°\text{)}$$

-continued $$\hat{U}_6 = \exp\left(-\frac{i5\pi}{6}\hat{\sigma}_Y\right) \text{ (rotate by 300°)}$$

Transformations 1 and 4 form one group, which we label F; transformations 2 and 5 form another, labelled G; transformations 3 and 6 form the last group, labelled H. The effect of these transformations on the input state is to rotate the state by the given rotation angle, for example, the $|+>_z$ state becomes the $|+>_{2\pi/3}$ state upon application of transform 3. Similarly transform 4 is the spin flip operator.

Bob(2) modulates the incoming photon from Bob(1) with one of these 6 transformations to give a transformed state (for example, applying transform 3 to the state $|->_{2\pi/3}$ transforms it into the state $|+>_{\pi/3}$; the other transformations are easy to work out from (4.1) and a simple geometrical picture). The photon modulated by Bob(2) then travels on round the network to Alice who measures it in a known basis (in this instance we shall assume she chooses the Z basis). She publishes the result "agree" or "disagree" depending on the result of her measurement and her choice of initial state (here, for example, the result she publishes is whether or not the measured bit is identical to the transmitted bit which was "1"). Bob(1) and Bob(2) publicly disclose which group of transformations they used, either F, G or H, but not which of the two transformations in each group they used. They separate their data into those for which the same group of transformations was chosen and those for which different groups were selected. By comparing the statistics of agreements/disagreements published by Alice with those expected from using different groups Bob(1) and Bob(2) can check for the presence of an eavesdropper. The statistical tests which perform this function are described in [9,10]. An important feature of an RDP is the potential ability to assess the quality and quantity of an eavesdropper's information and to adopt an error reconciliation and privacy amplification as appropriate. The results from transmissions where Bob(1) and Bob(2) used the same group of transforms will, after this error-correction and privacy amplification procedure, form the secret key.

Another possible attack upon systems embodying the present invention requires Eve (the eavesdropper) to intercept the quantum channel on both sides of a given user Bob. Then by transmitting and detecting a multi-photon signal Eve can determine unambiguously the state of Bob's modulator. Again in practice it is likely to be very difficult for Eve to establish connections to two or more points in the network. Nonetheless, where it desired to protect against an attack of the type described this may be done by providing at least one of the receivers on the network with a photon detector connected to the network by a relatively weak tap. This photon detector need not be of the sensitivity of the single photon detectors employed conventionally in receivers, nor need every user have such a detector. The presence of such a detector in the network facilitates the detection of any multi-photon probe used by Eve.

REFERENCES

1. S. Wiesner, "Conjugate Coding", SIGACT News, 15 78 (1983).
2. C. H. Bennett and G. Brassard, "Quantum Cryptography: Public-Key Distribution and coin Tossing", in Proceedings of IEEE International Conference on Computers, Systems and Signal Processing, 175 (1984).
3. C. H. Bennett, F. Bessette, G. Brassard, L. Salvail and J. Smolin, "Experimental Quantum Cryptography", Journal of Cryuptology, 5 3 (1992).
4. S. J. D. Phoenix and P. D. Townsend, "Quantum Cryptography and Secure Optical Communication", BT Technology Journal, 11 65 (1993).
5. See reference [3] and also G. Brassard and L. Salvail, "Secret-Key Reconciliation by Public Discussion", Proceedings of Eurocrypt '93, to appear.
6. C. H. Bennett, G. Brassard and J. M. Robert, "Privacy Amplification by Public Discussion", SIAM Journal of Computing, 17 210 (1988).
7. C. H. Bennett, G. Brassard, C. Crepeau and U. M. Maurer, "Privacy Amplification Against Probabilistic Information", unpublished.
8. C. H. Bennett, "Quantum Cryptography Using any Two Non-Orthogonal States", Physical Review Letters, 68 3121 (1992).
9. S. M. Barnett and S. J. D. Phoenix, "Information-Theoretic Limits to Quantum Cryptography", Physical Review A, 48 R5 (1993).
10. S. M. Barnett and S. J. D. Phoenix, "Bell's Inequality and Rejected-Data Protocols for Quantum Cryptography", Journal of Modern Optics, 40 1443 (1993).

We claim:

1. A method of communication using quantum cryptography characterised in that two stations (Bob(1), Bob(2)) each independently modulate a single-photon signal transmitted from an external source to both the stations in series, the said signal subsequently passing on to a third station which detects the state of the signal, compares it with the state of the signal as originally transmitted, and communicates the results of the comparison to the two stations, the two stations thereby establishing a shared secret key for the subsequent encryption of traffic between the two stations.

2. A method of communication according to claim 1, in which the third station (Alice) includes the source for the single-photon signal and transmits the signal from the source encoded in a predetermined phase or polarisation state, and includes a single-photon detector and measures the state of the single-photon signal as returned from the two stations (Bob(1), Bob(2)).

3. A method according to claim 2, in which the single-photon signal is transmitted on a network including a looped-back path from the two stations (Bob(1), Bob(2)) to the transmitter (Alice).

4. A method according to claim 1, in which there are a multiplicity of stations (Bob(1), Bob(2) . . . Bob(N)) connected to the transmitter station by a common communications network, the method further comprising an initial contention step in which a selected two of the multiplicity of stations (Bob(1), Bob(2) . . . Bob(N)) establish an exclusive right to use specific transmissions of the single-photon signal for establishing a mutual secret key.

5. A method according to claim 1 including a step of comparing with a predetermined threshold statistics of rejected data determined to have been modulated by the two stations using different operators.

6. A communications system comprising a communications network arranged to carry a quantum channel, a single-photon source arranged to output single-photon signals onto the network, at least two stations (Bob(1), Bob(2)) connected to the network and each including a modulator arranged to modulate in series the single-photon signal and a third station (Alice) including a single-photon detector arranged to detect the single-photon signal after its modulation by the at least two stations (Bob(1), Bob(2)), in use the third station (Alice) comparing the state of the single-photon signal as received with the state of the signal as originally transmitted and communicating the result of the comparison to the two stations, and the two stations establishing thereby a shared secret key.

7. A system according to claim 6, in which the third station (Alice) includes both the single-photon source and the single-photon detector.

8. A system according to claim 7, in which the network includes a looped-back path from the two stations (Bob(1), Bob(2)) to the third station (Alice).

9. A system according to claim 6, in which a multiplicity of stations (Bob(1), Bob(2) . . . Bob(N)) are connected to the transmitter station by a common communications network.

10. A system according to claim 9, in which each of the multiplicity of stations (Bob(1), Bob(2) . . . Bob(N)) is responsive to control signals transmitted by Alice in an initial contention step to leave unmodulated a single-photon signal reserved for establishing a mutual secret key between two other of the multiplicity of stations (Bob(1), Bob(2) . . . Bob(N)).

11. A system according to claim 6, in which the communications network is an optical-fibre based LAN.

12. A transmitter station (Alice) adapted for use in a system according to claim 6.

13. A receiver station (Bob(1), Bob(2) . . . Bob(N)) adapted for use in a system according to claim 6.

* * * * *